Patented Feb. 11, 1930

1,746,993

UNITED STATES PATENT OFFICE

JULIAN K. DALE, OF FRESNO, CALIFORNIA, ASSIGNOR TO SUN MAID RAISIN GROWERS OF CALIFORNIA, OF FRESNO, CALIFORNIA, A CORPORATION OF CALIFORNIA

SIRUP AND PROCESS FOR MAKING THE SAME

No Drawing.   Application filed March 11, 1927.   Serial No. 174,707.

This invention relates to the production of improved sirups or extracts from raisins and other similar fruits, which can be utilized as sweetening agents and as raw materials for fermentation in the factory or household.

The sirups or extracts from raisins and similar fruits have not been widely produced or used because they contain a large number of objectionable impurities, many of which are of unknown composition. These impurities give rise to an unpleasant flavor, to a dark coloration, which tends to increase as the sirup ages, and to other undesirable properties of the sirup or extract. Some of the known impurities in the raisin extract or sirup are acid tartrates, which appear to be in a large degree responsible for the strongly acid condition of the extract or sirup, tannin bodies and protein material. Some of the coloring matters present in the sirup or extract can be easily removed by decolorizing carbons, as bone char or activated vegetable chars, but a large part cannot be readily removed by these agents. The sirups from raisins and other acid fruits usually are composed mainly of invert sugar, which tends to crystallize upon concentration of the sirup or extract.

Because of these many factors a fundamentally different problem is faced in the refining of raisin sirup than is faced in the case of the refining of sirup from cane, beet, and many other vegetables or fruits. In the refining of cane or beet juices or sirups, the ultimate object is to produce dry crystalline sugars, and a sirup or molasses is formed as a by-product. Contrary to this, the ultimate object of the present invention is the production of a sirup, or a magma of crystals in sirup, from raisins. In the making of sugar from cane or beet sirups, the non-sugar impurities can be washed away from the crystals after the formation of the crystals in the final steps of the process, but in the refining of raisin sirups or like sirups, it is impossible to remove the impurities in this manner in view of the fact that the sirup, and not the crystals, is the final product.

The sirups from the cane and the beet are composed princiaplly of sucrose, while sirups prepared from raisins or other acid dried fruits consist principally of invert sugar, a mixture of dextrose and levulose.

When a fruit extract, the solids of which consist essentially of invert sugar, is evaporated to a heavy consistency such as about 80° Brix, the dextrose constituent of the invert sugar has a tendency to crystallize, producing a magma which for many purposes is undesirable.

The character of the impurities found in raisin sirup differs greatly from the character of those found in cane or beet sirups, and the methods which must be employed to remove such objectionable impurities are very different.

The object of this invention is to produce a refined raisin or like sirup which will be free in a large degree from the impurities which cause an objectionable flavor and darkening in color. Another object of this invention is to produce a concentrated raisin sirup which will not readily crystallize.

It has been found that if a raisin extract which is strongly acid as obtained from the raisin, is subjected to an alkaline treatment, a large number of the objectionable impurities will be precipitated or neutralized. Also it has been found possible to reduce the acidity and to remove a substantial portion of the non-sugar solids by concentration. In the case of the employment of an alkaline treatment, the sirup or extract should be left in alkaline condition as short a time as possible, in view of the fact that a condition of alkalinity appears to produce discoloration. It is possible to retard or to prevent crystallization of dextrose in the concentrated sirup by the addition of sucrose, or by the addition of some material, which contains sucrose, during some step in the process.

The preferred method of purifying the sirup or extract is to add a caustic alkali, for example caustic soda, to the acid extract or sirup until it becomes slightly alkaline. Other alkalies may be used instead of caustic soda, but caustic soda is preferred. Before this alkalinizing step, the extract may be concentrated, which will cause the precipitation of a large amount of the acidic material present, and which will therefore reduce the amount of the alkali which must be used in the alkalinizing step. At some stage of the process, or at several stages, the sirup should be subjected to a treatment with vegetable or bone char, in order to remove a substantial portion of the coloring matter.

The following is a detailed method of procedure, but this invention is not restricted thereto, and many variations can be made in the process and many of the steps can be omitted.

Raisins, or similar dried fruits, such as figs, dates, prunes, apricots, peaches, berries, bananas, apples, etc., are stemmed, cleaned, and perforated, and then are extracted with water in a battery. There may be mixed with the raisins at this point some other fruit, which will produce a substantial amount of sucrose in the resulting sirup. The removal of the desirable sugars from the raisins may also be accomplished by special treatments. The raisins may be treated first to break and remove the skins and seeds. Then they can be pressed, squeezed or centrifuged with water, steam and the like.

This extract is filtered to remove the suspended impurities, and the extract at this point may be treated with some adsorbent decolorizing agent to remove a portion of the coloring matters, but this step may be omitted at this point. The filtered extract is then evaporated to a density of approximately 55° Brix. This semi-sirup which has been produced by the evaporation step is cooled, whereupon a large amount of the non-sugar solid content will crystallize. The crystallized portion will consist principally of cream of tartar. At this stage, the sirup is still strongly acid having a pH value of about 5 to 5.5.

The semi-sirup is then filtered to remove the precipitate. For the next step the filtrate should be diluted with water to a density of not more than 50° Brix, or it may be reduced to 35 or 40°, but more dilution than is necessary is to be avoided since the sirup in the final stage of the refining process must be reconcentrated to about 80° Brix.

This diluted semi-sirup is then neutralized with caustic soda until it is slightly alkaline. After this alkalinizing treatment, it should have a pH of preferably about 7.5. Instead of caustic soda, any other alkali, such as potassium hydroxide, sodium carbonate, sodium aluminate, sodium silicate, or sodium phosphate, could be used. These last three are not very satisfactory, inasmuch as they are expensive, and moreover cause the formation of other precipitates and add foreign matter to the liquor which would have to be subsequently removed.

The neutralized or alkalinized liquor is now heated to about 65–75° C. At this point there will be a coagulation and separation of impurities mostly of unknown composition, which will result in the formation of a flocculent precipitate. It does not appear that all the objectionable impurities contained in the sirup are removed in this precipitate, but it does appear that a large portion of the unprecipitated impurities have been so changed by the treatment with caustic alkali that they no longer are present in objectionable form. The semi-sirup is then filtered to remove these coagulated impurities. Filter aids, such as kieselguhr may be added to expedite the filtration.

The clear filtered liquid is then acidified, preferably to a pH value of about 5.5. Hydrochloric acid is a most satisfactory acid to use, although phosphoric acid, sulphuric acid or edible organic acids may be used in place of hydrochloric acid. This acidification step should take place as soon as possible after filtration to prevent, so far as possible, the darkening which tends to take place while the liquor is in alkaline condition. The acidified liquor is then evaporated to about 55° Brix. In case the liquid has not been diluted during the process, this evaporation or concentration step would not be necessary, but it is probable that the liquor at this stage will have been diluted by the admixture of wash water from the filter press cakes.

Although the liquid could be decolorized at other points by treatment with a decolorizing agent having a high adsorptive power such as bone or vegetable char, this is the preferred point for subjecting the process liquor to a decolorizing treatment. After decolorization the liquid is evaporated to a finished sirup of about 80° Brix.

The use of caustic soda or another alkali metal compound as alkalinizing agent is much to be preferred over the use of lime or other alkaline earths. In a treatment with lime it is necessary to first dilute the semi-sirup from which the tartaric acid compounds have been removed by concentration to about 30 or 35° Brix. This makes necessary a very expensive concentration or evaporation during the latter stages of the process. Also the removal of the last traces of lime is very troublesome and unless the lime is completely removed, a cloudiness or precipitate will be formed in the finished sirup, due to a combination of the calcium with various ingredients of the sirup. To remove the lime it would be necessary to carbonate the limed liquor, filter out the precipitated calcium carbonate, and then in addition to add expensive phosphoric acid or phosphates to remove the residual calcium remaining in solution after the carbonation. In the caustic alkali process it is unnecessary to carry out these expensive and tedious purification operations.

The sirup prepared by this process has the advantage of being neutral in flavor; the flavor characteristics of raisins being removed for the greater part and it therefore can be utilized in many instances where a raisin flavored sirup would prove undersirable.

A heavy sirup produced from raisins or other fruits, whose sugar is primarily invert sugar, by the above process or any other process, is likely to partially crystallize to a semi-solid magma. This crystallization can be retarded or prevented by admixing with the fruit extract sucrose or sucrose containing material. The sucrose or sucrose containing material can be mixed with the extract or the concentrated sirup or at any convenient intermediate stage.

When sucrose is used it is preferred to dissolve the sucrose in water to make a semi-sirup of about 50° Brix and mix this semi-sirup into the process semi-sirup just before treatment with the decolorizing carbon. It is preferred to add an amount of sucrose that will equal about 25% of the solid content of the semi-sirup which has been obtained from the raisin or other acid fruit. But, of course, the addition of sucrose at this stage would be unnecessary if during the extraction step there had been present an amount of a sucrose containing fruit, which would result in the addition of sufficient sucrose to the process liquor to give the desired effect. Other sugars could be used in place of sucrose to retard the crystallization.

It is to be understood that the word "sirup" as used in the specification and claims of this application includes both the clear sirup and mixture of sirup and crystals.

The expression "raisin-like" sirup or extract, used in the claims, covers raisin sirups and other sirups which present a similar refining problem.

What is claimed is:

1. A method of refining a raisin-like sirup, which comprises treating the extract from sugar-containing raisin-like fruits with an alkaline compound of an alkali metal to alkalinize the same.

2. A method of refining a raisin-like sirup, which comprises treating the extract from sugar-containing, raisin-like fruits with caustic alkali to alkalinize the same.

3. A method of producing a raisin sirup, which comprises extracting raisins, concentrating the extract, filtering the concentrate, and alkalinizing the filtrate with an alkaline compound of an alkali metal.

4. A method of retarding the crystallization of concentrated sirups from acid fruits, which comprises reducing the acidity sufficiently to prevent inversion of the sucrose and then adding sucrose thereto.

5. The method of claim 4 in which the acid fruit is the raisin.

6. A stabilized neutral flavored raisin sirup substantially free of calcium salts and tartaric acid and containing sodium salts of strong mineral acids and approximately equal parts of dextrose and levulose and having a Brix of over 55°.

7. A stabilized neutral flavored raisin sirup substantially free of calcium salts and tartaric acid, containing approximately equal parts of dextrose and levulose and having a Brix of over 50, and also containing sucrose as a crystallization-retarding agent.

In testimony whereof I have hereunto signed my name.

JULIAN K. DALE.